(12) United States Patent
Feng et al.

(10) Patent No.: US 10,717,232 B2
(45) Date of Patent: *Jul. 21, 2020

(54) MATERIAL SETS

(71) Applicant: Hewlett-Packard Development Company, L.P., Houston, TX (US)

(72) Inventors: Yi Feng, San Diego, CA (US); Erica Montei Fung, San Diego, CA (US); Michael A. Novick, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/073,278

(22) PCT Filed: May 13, 2016

(86) PCT No.: PCT/US2016/032264
§ 371 (c)(1),
(2) Date: Jul. 26, 2018

(87) PCT Pub. No.: WO2017/196358
PCT Pub. Date: Nov. 16, 2017

(65) Prior Publication Data
US 2019/0030802 A1    Jan. 31, 2019

(51) Int. Cl.
| | |
|---|---|
| *B29C 64/165* | (2017.01) |
| *B33Y 70/00* | (2020.01) |
| *B29C 64/20* | (2017.01) |
| *B33Y 10/00* | (2015.01) |
| *C08K 3/04* | (2006.01) |

(Continued)

(52) U.S. Cl.
CPC ............ *B29C 64/165* (2017.08); *B29C 64/20* (2017.08); *B33Y 10/00* (2014.12); *B33Y 70/00* (2014.12); *C08K 3/04* (2013.01); *B29C 64/357* (2017.08); *B29K 2077/00* (2013.01); *B29K 2105/005* (2013.01); *B29K 2105/0005* (2013.01); *B33Y 30/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 5,169,871 A | 12/1992 | Hughes et al. |
| 6,245,281 B1 | 6/2001 | Scholten et al. |

(Continued)

FOREIGN PATENT DOCUMENTS

| | | |
|---|---|---|
| CN | 105754334 A | 7/2016 |
| WO | WO-9511006 | 4/1995 |

(Continued)

*Primary Examiner* — Mary Lynn F Theisen
(74) *Attorney, Agent, or Firm* — HPI Patent Department

(57) ABSTRACT

The present disclosure is drawn to material sets for 3-dimensional printing, 3-dimensional printing systems, and 3-dimensional printed parts. A material set can include a polyamide polymer powder having an average particle size from 20 μm to 120 μm and a fusing agent. The polyamide-11 can have a solution viscosity from 1.5 to 1.75 at room temperature, and may increase by no more than 5% after exposure to 180° C. for 20 hours. The fusing agent can include an energy absorber capable of absorbing electromagnetic radiation to produce heat.

20 Claims, 2 Drawing Sheets

(51) Int. Cl.
*B33Y 30/00* (2015.01)
*B33Y 80/00* (2015.01)
B29C 64/357 (2017.01)
B29K 77/00 (2006.01)
B29K 105/00 (2006.01)

(56) References Cited

U.S. PATENT DOCUMENTS

| | | | |
|---|---|---|---|
| 6,706,234 B2 | 3/2004 | Huang | |
| 7,148,286 B2 | 12/2006 | Baumann et al. | |
| 7,211,615 B2 | 5/2007 | Baumann et al. | |
| 7,468,405 B2 | 12/2008 | Allen et al. | |
| 7,906,063 B2 | 3/2011 | Monsheimer et al. | |
| 8,066,933 B2 | 11/2011 | Monsheimer et al. | |
| 8,124,686 B2 | 2/2012 | Loyen et al. | |
| 8,173,258 B2 | 5/2012 | Monsheimer et al. | |
| 8,236,418 B2 | 8/2012 | Booth et al. | |
| 8,334,025 B2 | 12/2012 | Fong et al. | |
| 2007/0238056 A1* | 10/2007 | Baumann | B33Y 10/00 430/325 |
| 2007/0241482 A1* | 10/2007 | Giller | B29C 64/165 264/494 |
| 2008/0122141 A1 | 5/2008 | Bedal et al. | |
| 2008/0166496 A1* | 7/2008 | Monsheimer | C08J 3/14 427/510 |
| 2012/0315483 A1 | 12/2012 | Baumann et al. | |
| 2013/0171416 A1* | 7/2013 | Diekmann | B29C 67/04 428/156 |
| 2014/0141166 A1 | 5/2014 | Rodgers | |
| 2014/0371364 A1 | 12/2014 | Monsheimer et al. | |
| 2015/0024316 A1 | 1/2015 | Orrock et al. | |
| 2016/0107337 A1 | 4/2016 | Acerbo et al. | |
| 2017/0247552 A1 | 8/2017 | Prasad et al. | |
| 2017/0253702 A1 | 9/2017 | Ma et al. | |

FOREIGN PATENT DOCUMENTS

| | | |
|---|---|---|
| WO | WO-2014209994 | 12/2014 |
| WO | WO-2015124639 | 8/2015 |
| WO | WO-2016030490 | 3/2016 |
| WO | WO-2016048375 | 3/2016 |
| WO | WO-2016060469 | 4/2016 |
| WO | WO-2017196358 | 11/2017 |

* cited by examiner

MATERIAL SETS

BACKGROUND

Methods of 3-dimensional (3D) digital printing, a type of additive manufacturing, have continued to be developed over the last several years. Various methods for 3D printing have been developed, including heat-assisted extrusion, selective laser sintering, photolithography, as well as others. In general, 3D printing technology improves the product development cycle by allowing rapid creation of prototype models for reviewing and testing.

Figure 1:
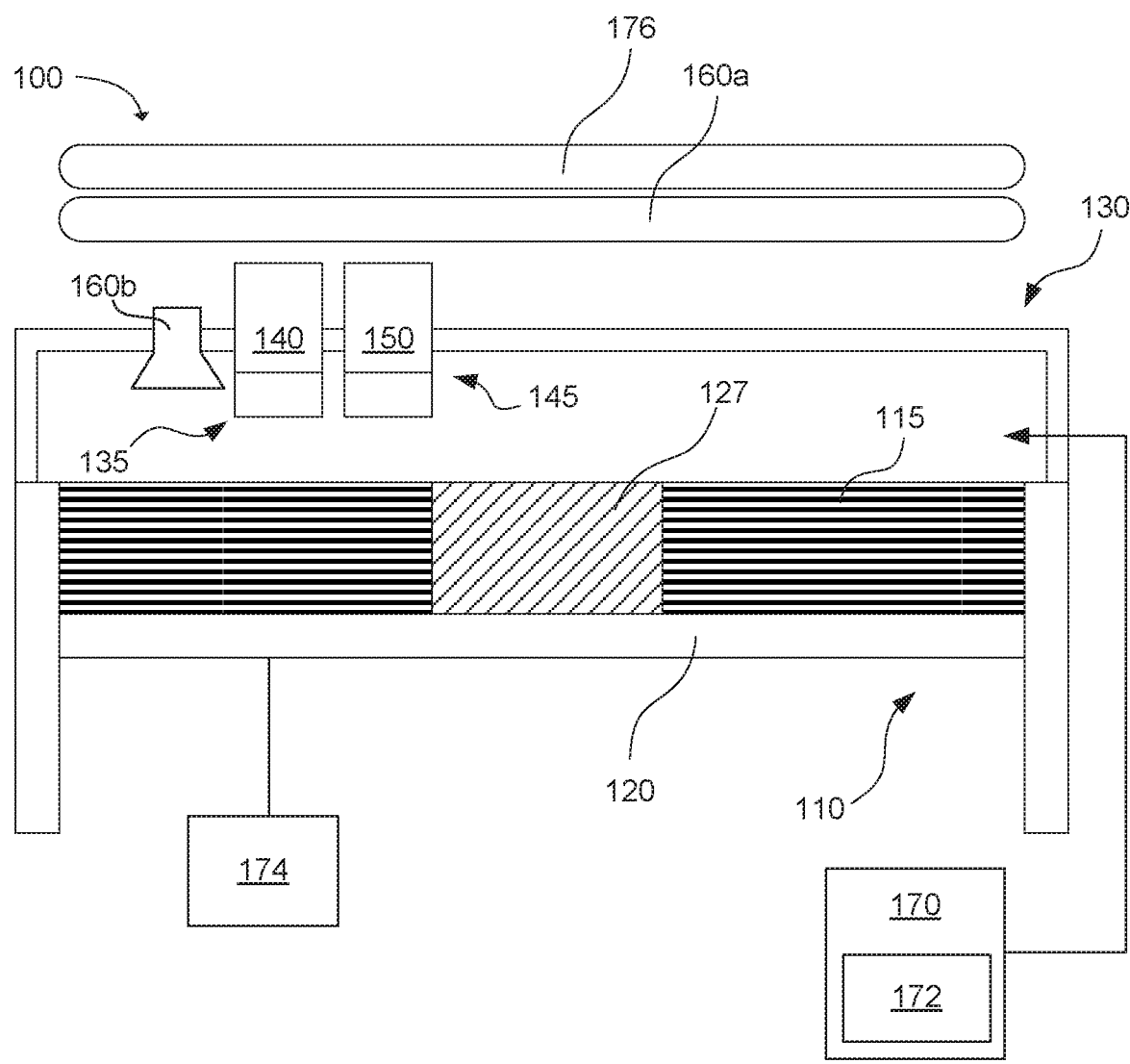
FIG. 1 is a schematic view of an example 3-dimensional printing system in accordance with the present disclosure.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets, systems for printing 3-dimensional parts, and 3-dimensional printed parts. In an exemplary printing process, a thin layer of powder bed material which includes a polyamide-11 powder can be spread on a powder bed. A print head, such as a fluid jet print head, may then be used to print a fusing agent over portions of the powder bed corresponding to a thin layer of the three dimensional object to be formed. Then, the powder bed with the fusing agent applied to the powder bed can be exposed to an electromagnetic radiation source, e.g., typically the entire bed. The fusing agent present where the part is being formed may typically absorb more energy from the electromagnetic radiation than the unprinted powder. The absorbed electromagnetic radiation can then be converted to thermal energy, causing the printed portions of the powder to melt and coalesce. This forms a solid layer. After the first layer is formed, a new thin layer of polymer powder can be spread over the powder bed and the process can then be repeated to form additional layers until the 3-dimensional part is printed. In accordance with examples of the present disclosure, the polyamide-11 powder can be preheated prior to introduction to the powder bed, and furthermore, can be heated still further once on the powder bed. As an example, the polyimide-11 powder may be preheated at from 130° C. to 175° C., and once on the platen base of the powder bed, the polyamide-11 powder may be heated to from 160° C. to 230° C. (e.g., heat provided by the platen base below as well as from overhead heating sources). It is these high temperatures that cause thermal degradation of the polyamide-11 powder, and thus, limit the recyclability of unused (unfused) powder over multiple part builds. However, in accordance with examples of the present disclosure, the recyclability of the composite particles described herein can be improved.

In accordance with this, in some examples of the present disclosure, a material set can include a powder bed material, including a polyamide-11 powder having an average particle size from 20 µm to 120 µm (particle size values can be obtained using laser scattering, such as by using Malvern Mastersizer S, version 2.18). The polyamide-11 powder can have a relative solution viscosity (which can also be referred to herein as "solution viscosity" for brevity) from 1.5 to 1.75 at room temperature as measured in 99.5 wt % m-cresol (using ISO 307 method which is described herein in more detail below). The material set may further include a fusing agent including an energy absorber capable of absorbing electromagnetic radiation to produce heat.

In another example, a 3-dimensional printing system can include a powder bed with a powder bed material including a polyamide-11 powder having an average particle size from 20 µm to 120 µm. The polyamide-11 powder may have a solution viscosity from 1.5 to 1.75 at room temperature. The system can further include a fluid jet printer including a fluid jet pen in communication with a reservoir of a fusing agent to print the fusing agent onto the powder bed. The fusing agent may include an energy absorber capable of absorbing electromagnetic radiation to produce heat. The system can further include a fusing electromagnetic energy source, e.g., a fusing lamp, to expose the powder bed material to electromagnetic radiation sufficient to fuse polyamide-11 powder that has been printed with the fusing agent.

In another example, a 3-dimensional printed part can include a part body including multiple layers of energy absorber and powder bed material fused together. The powder bed material may include a polyamide-11 powder having an average particle size from 20 µm to 120 µm. The polyamide-11 powder may have a solution viscosity from 1.5 to 1.75 at room temperature. Furthermore, in this example, individual layers of the multiple layers may have a thickness from 20 µm to 150 µm. In certain examples, the X-Y axis and the Z axis elongation can be from 20% to 80%, the tensile strength in both X-Y axis and Z axis can be from 40 MPa to 60 MPa, and the tensile modulus in both X-Y axis and Z axis can be from 1300 MPa to 2100 MPa.

In accordance with this, the solution viscosity of the polyamide-11 powder can be from 1.5 to 1.75, or from 1.55 to 1.65, and may changes no more than 5% (or no more than 3%, or no more than 1%, or remains substantially the same) when exposed to 180° C. for 20 hours in air. By way of a specific example, with one specific polyamide-11 powder described herein, the initial solution viscosity can be about 1.61, and after exposure to heat and time in air, as described, the solution viscosity may be slightly increased to about 1.62. Furthermore, virgin or unheated polyamide-11 powder can be whitish in color with a yellow index less than about 10, and furthermore, after being aged at 180° C. for 20 hours in air, the powder may yellow only slightly, remain whitish in color with a yellow index value no greater than about 40, or no greater than about 25, or no greater than about 15. Yellow index values (before and after heating) can be obtained using the ASTM D1925 method (Plastic Test Standard for Yellowing).

As mentioned, the powder bed material can include a polyamide-11 powder with an average particle size from 20 µm to 120 µm. The "particle size" refers to the diameter of spherical particles, or to the longest dimension of non-spherical particles. In further detail, and in accordance with certain specific examples, the particle size distribution of the polyamide-11 powder can be as follows:

D50 can be from 35 µm to 65 µm, from 40 µm to 60 µm, or about 50 µm; D10 can be from 15 µm to 45 µm, from 20 µm to 40 µm, or about 30 µm; and D90 can be from 65 µm to 95 µm, from 75 µm to 85 µm, or about 80 µm. "D50" is defined as the median weight. "D10" is defined as the tenth-percentile by weight of powder that is below a given particle size, e.g., from 20 μm to 50 μm. "D90" is defined as the ninetieth-percentile by weight of powder that is below a given particle size, e.g., 75 μm to 100 μm. Furthermore, the polyamide-11 powder can have a melting or softening point from about 170° C. to about 210° C., or about 176° C. to about 205° C. In further examples, the polymer can have a melting or softening point from about 195° C. to about 203° C.

The molecular weight of the polyamide-11 powder can be characterized using relative solution viscosity (or "solution viscosity" for brevity) as a proxy for molecular weight. "Solution viscosity" is defined by combing 0.5 wt % polyamide-11 powder with 99.5 wt % M-cresol and measuring the viscosity of the admixture at room temperature. Further details for determining solution viscosity under this measurement protocol are described in International Standard ISO 307, Fifth Edition, 2007 May 15. In some detail, the solution viscosity measurement can be used as a proxy for molecular weight, and essentially measures the viscosity using a capillary viscometer. The measurement is based on the time it takes for a certain volume of fluid (solvent or solution) to pass through a capillary viscometer under its own weight or gravity compared to the same fluid (solvent or solution) admixed with a small amount of the polymer powder. The higher the viscosity, the longer it takes for the fluid to pass through. Thus, relative solution viscosity is defined as a ratio that compares the time for a fluid with the polymer powder to pass through the capillary compared to the time it takes for the fluid alone to pass therethrough. Thus, the fluid with the polymer powder is more viscous than the pure fluid, so the ratio is always a number greater than 1. In accordance with the present disclosure, by way of example, if it takes m-cresol solvent 120 second to go through the capillary viscometer, and it takes solution of 0.5 wt % of PA-11 in 99.5 wt % m-cresol 180 second to go through the same capillary viscometer, then the relative solution viscosity is 180/120 which is 1.5.

Thermal degradation of the polyamide-11 powder being tested can further be determined using the solution viscosity measurement (ISO 307) after a predetermined amount of time at a specific temperature profile. For example, in accordance with one example of the present disclosure, because the powder may typically be exposed to heat during 3-dimensional modeling or printing on the order of about 160° C. to 180° C. (e.g., feed powder temperature about 140-160° C., platform heater about 165-180° C., powder temperature from heating lamps during printing at about 170-185° C., etc.), one reactivity test may include exposing the powder to 180° C. for 20 hours with an air environment (which may be above or toward the upper end than typical printing conditions). This is not to say that higher temperatures may not otherwise be used. As an example, temperatures up to 230° C. may be used in some circumstances. However, for consistency in determining solution viscosity before and after exposure to prolonged heat, the profile of 180° C. for 20 hours in air is used when discussing solution viscosity values. Thus, under these conditions, thermal degradation can be evaluated by determining a change (typically an increase due to continue polymerization through reactive end groups of the polyamide-11) in solution viscosity to establish relative solution viscosity stability, which correlates to relative molecular weight stability, e.g., change in solution viscosity less than about 5% or less than about 3% indicates relative molecular weight stability within a certain range. When the solution viscosity increases upon exposure to heat, a solution viscosity range at room temperature may be about 1.5 to 1.75, and after exposure to heat as described herein, the solution viscosity may change, e.g., increase in one example, to a value no greater than about 1.8 at 180° C. for 20 hours in air.

In further detail regarding molecular weight stability (characterized using solution viscosity stability as a proxy for measuring molecular weight and change in molecular weight after exposure to heat for a period of time), the chemistry of relative long polyamide-11 polymer chains undergo oxidation or thermal degradation when exposed to heat. As the polymer breaks down and degrades, it becomes apparent by significant yellowing. In accordance with examples of the present disclosure, by preparing polyamide-11 polymer having an initial molecular weight range with a solution viscosity from 1.5 to 1.75 and a molecular weight increase by no more than 5% as measured by solution viscosity after exposure to 180° C. for 20 hours, the thermal degradation can be largely counterbalanced by the reactivity of the end groups. Thus, on average, shorter chain polymers that may be formed by thermal degradation of the polyamide-11 can likewise react with other oxidized or non-oxidized polymer chains using the end groups. By balancing the breakdown and the reactivity out, the average polymer chain length (e.g., molecular weight or solution viscosity) can remain similar to the initial polymer chain length (e.g., molecular weight or solution viscosity). In other words, the polyamide-11 powder described herein has a molecular weight or solution viscosity with a range that is useful for 3-dimensional printing described herein, and the reactivity of the polyamide-11 powder end groups is such that it is similarly matched to compensate for thermal degradation (which inherently lowers the molecular weight), e.g., with up to a 5% change in solution viscosity at 180° C. for 20 hours in air. In one specific example, the solution viscosity may be initially at room temperature from 1.5 to 1.75 and may be only minimally change, e.g., increase, after exposure to 180° C. for 20 hours in air, e.g., increased to up to about 1.8. In an alternatively example, the initial solution viscosity may be from 1.55 to 1.7, and may remain within this range after exposure to the heat profile described herein.

In certain examples, the polyamide-11 powder can have a variety of shapes, such as substantially spherical particles or irregularly-shaped particles. In either case, the longest axis to shortest axis of the particles can have an average aspect ratio of less than 2:1 (longest axis to shortest axis). More typically, the aspect ratio may be closer to about 1:1.

In some examples, the polyamide-11 powder may also be capable of being formed into 3D printed parts with a resolution of 20 μm to 120 μm, or even better when using smaller particles within the range. As used herein, "resolution" refers to the size of the smallest feature that can be formed on a 3D printed part. The polymer powder can form layers from about 20 μm to about 150 μm thick, allowing the fused layers of the printed part to have roughly the same thickness. This can provide a resolution in the Z axis direction of about 20 μm to about 120 μm. The polyamide-11 powder can also have a sufficiently small particle size and sufficiently regular particle shape to provide about 20 μm to about 100 μm resolution along the x-axis and y-axis.

In further detail, powder bed material with the polyamide-11 powder can be further modified with the inclusion of an anti-oxidant blended therewith. By reducing overall thermal degradation of the polyamide powder using a blended anti-oxidant powder, the reactivity of the end groups can be formulated to be less aggressively reactive, as some thermal degradation is reduced by the presence of the anti-oxidant. Thus, the formulation of the powder bed material can be such that at 180° C. for 20 hours in air, the thermal degradation rate of the polyamide-11 chains, the reactivity of the end groups, and anti-oxidation effectiveness of the anti-oxidant can be matched such that the solution viscosity may be modified by no more than 5% (from initial solution viscosity to solution viscosity after heating). In certain examples, Irganox BBM (CAS:85-60-9), or BNX-1098 (CAS:23128-74-7), or BNX MD-1024 (CAS:32687-78-8) may be used. The anti-oxidant can, for example be in the form of fine particles, e.g., 5 μm or less, that are dry blended with the polyamide-11 powder, and furthermore, may be present at a relative low concentration in the powder bed material, e.g., from 0.01 wt % to 2 wt % or from 0.2 wt % to 1 wt %.

In some examples, the polyamide-11 powder can be colorless. For example, the polymer powder can have a white, translucent, or transparent appearance. When used with a colorless fusing agent, such polyamide-11 powder can provide a printed part that is white, translucent, or transparent. In other examples, the powder bed material can be colored by adding colorant with the polyamide-11 powder for producing colored parts. In still other examples, when the polymer powder is white, translucent, or transparent, color can be imparted to the part by the fusing agent or another colored fluid or ink.

The polyamide-11 powder can also, in some cases, be blended with a filler. The filler can include inorganic particles such as alumina, silica, glass, and/or other similar fillers. When the polyamide-11 powder fuses together, the filler particles can become embedded in the polymer, forming a composite material. In some examples, the filler can include a free-flow filler, anti-caking filler, or the like. Such fillers can prevent packing of the polyamide-11 powder, coat the powder particles and smooth edges to reduce inter-particle friction, and/or absorb moisture. In some examples, a weight ratio of polyamide-11 powder to filler particles can be from 99:1 to 1:2, from 10:1 to 1:1, or from 5:1 to 1.1.

Material sets in accordance with the present technology can also include a fusing agent. The fusing agent can contain an energy absorber that is capable of absorbing electromagnetic radiation to produce heat. The energy absorber can be colored or colorless. In various examples, the energy absorber can include carbon black, near-infrared absorbing dyes, near-infrared absorbing pigments, tungsten bronzes, molybdenum bronzes, metal nanoparticles, conjugated polymers, or combinations thereof.

Examples of near-infrared absorbing dyes include aminium dyes, tetraaryldiamine dyes, cyanine dyes, pthalocyanine dyes, dithiolene dyes, and others. In further examples, the energy absorber can be a near-infrared absorbing conjugated polymer such as poly(3,4-ethylenedioxythiophene)-poly(styrenesulfonate) (PE DOT: PSS), a polythiophene, poly(p-phenylene sulfide), a polyaniline, a poly(pyrrole), a poly(acetylene), poly(p-phenylene vinylene), polyparaphenylene, or combinations thereof.

As mentioned, the energy absorber can include a conjugated polymer. As used herein, "conjugated" refers to alternating double and single bonds between atoms in a molecule. Thus, "conjugated polymer" refers to a polymer that has a backbone with alternating double and single bonds. In many cases, the energy absorber can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In some examples, the fusing agent can have a black or gray color due to the use of carbon black as the energy absorber. Thus, carbon black is good choice for use as an energy absorber when a colored part is intended, e.g., black or gray or other color mixed with black or gray. However, in other examples the fusing agent can be colorless or nearly colorless. The concentration of the energy absorber can be adjusted to provide a fusing agent in which the visible color of the fusing agent is not substantially altered by the energy absorber. Although some of the above described energy absorbers have low absorbance in the visible light range, the absorbance is usually greater than zero. Therefore, the energy absorbers can typically absorb some visible light, but their color in the visible spectrum can be minimal enough that it does not substantially impact the fusing agent's ability to take on another color when a colorant is added (unlike carbon black which dominates the fluid color with gray or black tones). The energy absorbers in concentrated form can have a visible color, but the concentration of the energy absorbers in the fusing agent can be adjusted so that the energy absorbers are not present in such high amounts that they alter the visible color of the fusing agent. For example, an energy absorber with a very low absorbance of visible light wavelengths can be included in greater concentrations compared to an energy absorber with a relatively higher absorbance of visible light. These concentrations can be adjusted based on a specific application with some experimentation. In one example, the energy absorber can have a concentration in the fusing agent such that after the fusing agent is printed onto the polymer powder, the amount of energy absorber in the polymer powder can be from 0.0003 wt % to 10 wt %, or from 0.005 wt % to 5 wt %, with respect to the weight of the polymer powder.

The amount of energy absorber in the fusing agent can vary depending on the type of energy absorber. In some examples, the concentration of energy absorber in the fusing agent can be from 0.1 wt % to 20 wt %. In one example, the concentration of energy absorber in the fusing agent can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %. In one example, the concentration of the energy absorber can be high enough that the energy absorber impacts the color of the fusing agent, but low enough that when the fusible agent is printed on the powder bed material, the energy absorber does not substantially impact the color of the powder. Thus, in this example, the concentration of the energy absorber can be balanced with the amount of fusing agent that is to be printed on the polymer powder so that the total amount of energy absorber that is printed onto the polymer powder is low enough that the visible color of the polymer powder is not impacted. That being mentioned, there may also be cases where the energy absorber is selected so that a deliberate color is provided to the printed part. Carbon black is an example of such an energy absorber.

The energy absorber can have a temperature boosting capacity sufficient to increase the temperature of the polymer powder above the melting or softening point of the polymer powder. As used herein, "temperature boosting capacity" refers to the ability of an energy absorber to convert electromagnetic radiation, e.g., infrared or near-infrared light energy, into thermal energy to increase the temperature of the printed powder bed material (containing the polyamide-11 powder) over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable more amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polyamide-11 powder coalesces in the presence of the energy absorber while the remaining powder remains separate and loose, typically suitably so for recycling. Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point. When the fusing agent is printed on a portion of the polyamide-11 powder, the energy absorber can heat the printed portion to a temperature at or above the melting or softening point, while the unprinted portions of the polymer powder remain below the melting or softening point. This allows the formation of a solid 3D printed part, while the loose powder can be easily separated from the finished printed part.

In accordance with examples of the present disclosure, the unused powder bed material, which includes the polyamide-11 powder, can be readily recycled for future part printing jobs. Because the polyamide-11 powder described herein is stable when exposed to heat, the powder bed material can be refreshed by adding only minimal amounts of fresh powder bed material. For example, by refreshing the powder bed material with as little as 30 wt %, 20 wt %, or 10 wt % fresh powder, the powder bed material can be heated or cooled (or build cycled) more than 4 times, more than 6 times, more than 8 times, or more than 10 times. Each instance of heating and cooling can be referred to as one "cycle." In one example, the powder can be cycled 10 times, only refreshing the powder using 20 wt % fresh powder added for each new cycle.

Returning to the energy absorber per se, the energy absorber can have a temperature boosting capacity from about 10° C. to about 70° C. for the polyamide-11 powder, which has a melting or softening point from about 170° C. to about 210° C. If the powder bed material is at a temperature within about 10° C. to about 70° C. of the melting or softening point, then such an energy absorber can boost the temperature of the powder bed material up to the melting or softening point, while the unprinted powder remains at a lower temperature. In some examples, the powder bed material can be preheated to a temperature from about 10° C. to about 70° C. lower than the melting or softening point of the polymer. The fusing agent can then be printed onto the powder bed material and the powder bed can be irradiated with electromagnetic radiation (suitable matched to the thermal excitation frequency of the energy absorber) to coalesce the printed portion of the powder.

In further examples, the material set can include colored fluids or inks for adding color to the thermoplastic polymer powder. The colored fluids or inks can include any suitable colorant, including dyes and/or pigments. This can allow for printing of full-color 3-dimensional parts. In one example, the material set can include cyan, magenta, yellow, and/or black inks in addition to the fusing agent and other fluids or inks, if present. Alternatively, even the fusing agent itself can include a pigment or dye colorant that imparts a visible color to the fusing agent. In still other examples, the colorant may also be the same as the energy absorber itself, e.g., carbon black.

In either example, whether the colorant is present in a separate fluid or in the fusing agent per se, the colorant can be present in an amount from 0.1 wt % to 10 wt % in the fluid, ink, or agent. In one example, the colorant can be present in an amount from 0.5 wt % to 5 wt %. In another example, the colorant can be present in an amount from 2 wt % to 10 wt %. In some examples, the colored inks can be used to print 3D parts that retain the natural color of the polymer powder, or a polymer powder that is already colored to some degree. Additionally, in one example, the fluid, inks, or fusible agent can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described fusing agent and/or inks, and thus ultimately, the printed part.

The components of the above described fluids, e.g., colored inkjet inks and fusing agents, can be selected to give the respective fluids good fluid jetting performance and the ability to fuse the polymer bed material and/or color the polymer powder with good optical density. Thus, these fluids can include a liquid vehicle. In some examples, the liquid vehicle formulation can include one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can include dispersants in an amount from 5 wt % to 20 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble energy absorber can be used with an aqueous vehicle. Because the energy absorber is dispersible or soluble in water, an organic co-solvent may not be present, as it may not be included to solubilize the energy absorber. Therefore, in some examples the fluids can be substantially free of organic solvent, e.g., predominantly water. However, in other examples a co-solvent can be used to help disperse other dyes or pigments, or improve the jetting properties of the respective fluids. In still further examples, a non-aqueous vehicle can be used with an organic-soluble or organic-dispersible energy absorber.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, one or more surfactant can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, as mentioned, various other additives can be employed to improve certain properties of the fluid compositions for specific applications. Examples of these additives are those added to inhibit the growth of harmful microorganisms. These additives may be biocides, fungicides, and other microbial agents, which can be used in ink various formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the fluid. From 0.01 wt % to 2 wt %, for example, can be used. Viscosity modifiers and buffers may also be present, as well as other additives to modify properties of the fluid as desired. Such additives can be present at from 0.01 wt % to 20 wt %.

In addition to the material sets described above, the present technology also encompasses 3-dimensional printing systems that include the material sets. An example of a 3-dimensional printing system is shown in FIG. 1. The system 100 includes a powder bed 110 including a powder bed material 115, which includes the polyamide-11 powder described herein and has an average particle size from 20 μm to 120 μm. In the example shown, the powder bed has a build platform or moveable floor 120 that allows the powder bed to be lowered after each layer of the 3-dimensional part is printed. The 3-dimensional part 127 is shown after printing the fusing agent 140 on the powder bed material. The system may also include a fluid jet printer 130 that includes a first fluid jet pen 135 in communication with a reservoir of the fusing agent. The first fluid jet pen can be configured to print the fusing agent onto the powder bed. A second fluid jet pen 145 can be in communication with a reservoir of a colored fluid or ink 150. The second fluid jet pen can be configured to print the colored ink onto the powder bed. In some examples, the 3-dimensional printing system can also include additional fluid jet pens in communication with a reservoir of fluid to provide other colors and/or functionality, or alternatively, a fluid to provide functionality can be used instead of the colored ink in the second fluid jet pen.

After the fusing agent 140 has been printed onto the powder bed material 115, a fusing electromagnetic radiation source, such as a fusing lamp, 160a or 160b can be used to expose the powder bed to electromagnetic radiation sufficient to fuse the powder that has been printed with the fusing agents. Fusing lamp 160a may be a stationary fusing lamp that rests above the powder bed, and fusing lamp 160b may be carried on a carriage with the fluid jet pens 135, 145. To print the next layer, the moveable floor is lowered and a new layer of powder bed material is added above the previous layer. Unused powder bed material, such as that shown at 115, is not used to form the 3-dimensional part, and thus, can be recycled for future use. Recycling can include refreshing the used powder bed material with a relatively small percentage of fresh powder bed material, e.g., as little as up to 30 wt % (1-30 wt %), up to 20 wt % (1-20 wt %), or up to 10 wt % (1-10 wt %).

To achieve good selectivity between the fused and unfused portions of the powder bed material, the fusing agents can absorb enough electromagnetic radiation or energy to boost the temperature of the thermoplastic polymer powder above the melting or softening point of the polymer, while unprinted portions of the powder bed material remain below the melting or softening point. Thus, as mentioned, the 3-dimensional printing system can include preheaters for preheating the powder bed material, and particularly the polyamide-11 powder, to a temperature near the melting or softening point. In one example, the system can include a preheater(s) to heat the powder bed material prior to printing. For example, the system may include a print bed heater 174 to heat the print bed to a temperature from 165° C. to 180° C., or from 170° C. to 175° C. The system can further include a supply bed or container 170 which may also include a supply heater 172 at a location where polymer particles are stored before being spread in a layer onto the powder bed 110. The supply bed or container can utilize the supply heater to heat the supply bed or container to a temperature from 140° C. to 160° C. Thus, when an overhead heating source 176, e.g., heating lamps, are used to heat up the powder bed material to a printing temperature, the typical minimum increase in temperature for printing can be carried out quickly, e.g., up to about 170° C. to 185° C., or even up to 230° C. To be clear, the overhead heating source used to heat the powder bed material for printing is typically a different energy source than the electromagnetic radiation source, e.g., fusing lamp 160a or 160b, used to thermally activate the energy absorber, though these energy sources could be the same depending on the energy absorber and powder bed material chosen for use.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing agents leaving the unprinted portions of the powder bed material below the melting or softening point.

In one example, the fusing lamp can be matched with the energy absorbers in the fusing agents so that the fusing lamp emits wavelengths of light that match the peak absorption wavelengths of the energy absorbers. An energy absorber with a narrow peak at a particular infrared or near-infrared wavelength can be used with a fusing lamp that emits a narrow range of wavelengths at approximately the peak wavelength of the energy absorber. Similarly, an energy absorber that absorbs a broad range of near-infrared wavelengths can be used with a fusing lamp that emits a broad range of wavelengths. Matching the energy absorber and the fusing lamp in this way can increase the efficiency of coalescing the polymer particles with the energy absorber printed thereon, while the unprinted polymer particles do not absorb as much light and remain at a lower temperature.

Depending on the amount of energy absorber present in the polymer powder, the absorbance of the energy absorber, the preheat temperature, and the melting or softening point of the polyamide-11 polymer, an appropriate amount of irradiation can be supplied from the fusing lamp. In some examples, the fusing lamp can irradiate individual layers from about 0.5 to about 10 seconds per pass, e.g., using one or multiple passes which can depend in part on the speed of a pass or passes.

Figure 2:
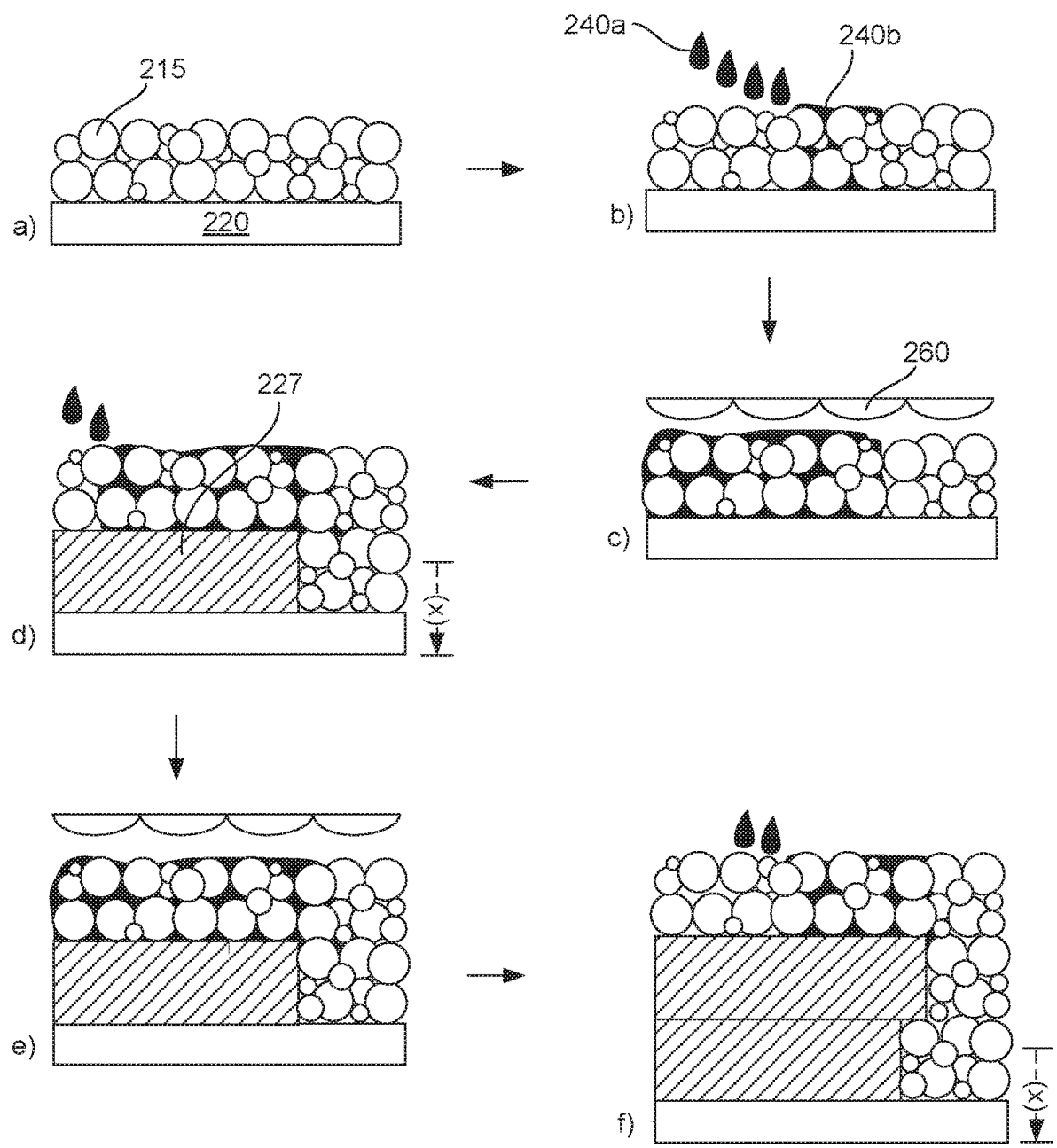
FIG. 2 is a schematic view of an example printing system and an example initial schematic representation of a 3-dimensional printed part printed using an example material set in accordance with the present disclosure.

Turning now to the building a 3-dimensional part as described herein as well as material sets for building 3-dimensional parts, FIG. 2 provides a specific example of the present disclosure. It is noted that there are six steps shown (a-f) in FIG. 2 that exemplify aspects of the technology, but this is provided merely for convenience in describing the present technology. Fewer or greater number of steps can be carried out, as desired for a particular application. Further, for brevity, some steps in FIG. 2 are shown in aggregate. For example step d) in FIG. 1 shows multiple steps together, unlike the separated steps shown in steps a) to c). Additionally, similar structures shown in steps a) to f) are labeled with reference numerals once or twice, but such references are applicable throughout all of FIG. 2 for clarity if viewing and understanding the FIG.

With specific reference to FIG. 2, a) shows a build platform or movable floor 220, to which is deposited a thin layer of powder bed material 215 (which can include the polyamide-11 powder, anti-oxidant, fillers, etc.). Next, b) shows droplets of a fusing agent 240a as well as already deposited fusing agent 240b applied to and within a portion of the powder bed material. The fusing agent thus admixes and fills voids within the build material, as shown in c), where the fusing agent and powder bed material are fused to form a fused part layer 227, and the movable floor is moved downward a distance of (x) corresponding to a 3-dimensional fused part layer thickness (e.g., 20 μm to 150 μm) where the process if repeated, as shown in steps d) to f). In other words, the powder bed material in this example is spread thinly (20 μm to 150 μm) on the movable floor, combined with fusing agent, fused with electromagnetic energy, the moveable floor dropped, and the process repeated with the prior layer acting as the movable floor for the subsequently applied layer. As can be seen, the second fusible part layer of the "in progress" 3-dimensional part shown at f) is supported by the first fusible part layer as well as by some of the fused powder bed material where the second layer may hang out or cantilever out beyond the first layer. Once the 3-dimensional part is built, unfused powder bed material may be collected and reused or recycled as described herein. Notably, FIG. 2 does not show any of the heating mechanisms that may be present, including a heater for the movable floor, a heater for the powder bed material supply, or overhead heaters that likewise may also be present.

The 3-dimensional part prepared as described herein can be formed of multiple layers of fused polymer stacked in a Z axis direction. The Z axis refers to the axis orthogonal to the x-y plane. For example, in 3-dimensional printing systems having a powder bed floor that lowers after each layer is printed, the Z axis is the direction in which the floor is lowered. The 3-dimensional printed part can have a number of surfaces that are oriented partially in the Z axis direction, such as pyramid shapes, spherical shapes, trapezoidal shapes, non-standard shapes, etc. Thus, virtually any shape that can be designed and which can be self-supporting as a printed part can be crafted.

In further detail, and related to FIGS. 1 and 2, a 3-dimensional printed part can be formed as follows. A fluid jet printer can be used to print a first pass of fusing agent onto a first portion of the powder bed material. In some cases, there will be other fluid pens, such as colored inks or other functional fluids. This can be done on one pass, two passes, three passes, etc. (back and forth may be considered two passes). If the electromagnetic radiation source is not a bar that sits overhead (which can be left in an on position, or cycled to turn on and off at appropriate times relative to fusing agent application), but rather is associated with the printing carriage, a curing pass can then be performed by passing a fusing lamp over the powder bed to fuse the polyamide-11 powder with the fusing agent. Multiple curing passes may be used in some examples. Individual passes of printing and curing can be followed by further deposit of the powder bed material.

It is noted that, as used in this specification and the appended claims, the singular forms "a," "an," and "the" include plural referents unless the context clearly dictates otherwise.

As used herein, "liquid vehicle" refers to a liquid in which additives are placed to form fluid jettable formulations, such as fusing agent, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and energy absorbers, the liquid vehicle can carry solid additives such as polymers, latexes, UV curable materials, plasticizers, salts, etc.

The term "fluid" herein does not exclude solid additives that may be suspended therein, as fluid generally includes both solutions and fine dispersions, such as in fusing agents, inks, functional fluids, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 0.1 wt %.

As used herein, "fluid jetting" or "jetting" refers to compositions that are ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLE

The following illustrates various examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Strength, Elongation, and Modulus Comparison

A first polyamide-11 powder was prepared in accordance with examples of the present disclosure (referred to hereinafter as "Powder A"). Furthermore, a commercially available polyamide-11 powder (Rilsan® Invent Natural from Arkema, Colombes, France) was obtained for comparative purposes. Specifically, Powder A had solution viscosity of 1.61 an average particle size of about 50 μm, and a melting temperature of 200° C. The Rilsan® Invent Natural had similar solution viscosity, particle size, and melting temperature.

The powders were tested for strength, elongation, and modulus along the X-Y axis (in line with the direction of the layers) and along the Z axis (perpendicular with the direction of the layers). The fusing agent used for the additive 3-dimensional printing was a carbon black-based fusing agent that included 5 wt % carbon black and a suitable liquid vehicle for jetting the fusing agent onto the respective powder layers, i.e. Rilsan® Invent Natural and Powder A. In essence, the printer powder supply and powder bed were (in separate tests) filled with the respective type of powder. The supply temperature was set at about 150° C. and the print bed temperature was set at 173° C. A heater under the print bed was set at 173° C. Printing occurred at a Contone value of about 80. The fusing agent was printed in the $1^{st}$ pass, while curing was performed in $1^{st}$, $2^{nd}$ and $3^{rd}$ passes using two 300 W bulbs placed approximately 1 cm away from the surface of the powder bed.

Essentially, each sample prepared included 600 fused layers which were printed at about a 100 μm thickness, and the respective strength, elongation at break, and modulus were measured for both the X-Y axis and the Z axis, using a tensile test following a standard procedure as described in ASTM D638. Before carrying out the tensile testing protocol, all samples were pre-conditioned at 23° C. and 50% relative humidity for least 24 hours after being built. In the tensile test, a pull speed of 10 mm/min was applied and an extensometer was used to gauge the true strain of samples within the gauge length.

The data for each test is shown in Tables 1 and 2 below:

TABLE 1

| X-Y Axis | | |
| --- | --- | --- |
| | Rilsan ® Invent Natural | Polyamide-11 Powder A |
| Strength (MPa) | 47 | 48 |
| Elongation (%) | 47 | 51 |
| Modulus (MPa) | 1650 | 1630 |

TABLE 2

| Z Axis | | |
| --- | --- | --- |
| | Rilsan ® Invent Natural | Polyamide-11 Powder A |
| Strength (MPa) | 49.5 | 49.1 |
| Elongation (%) | 50 | 45 |
| Modulus (MPa) | 1630 | 1462 |

As can be seen from Tables 1 and 2, Rilsan® Invent Natural and Powder A were very comparable in physical property values with the exception of Modulus in the Z-Axis, and thus, could be used interchangeably with in many instances. However, the heat stability of Powder A was significantly superior to the Rilsan® Invent Natural Powder, as shown in Example 2 below.

Example 2

Stability Comparison

Powder A described in Example 1 had good recyclability (or reusability) of its un-used powder, showing only an increase from 1.61 to 1.62 in viscosity after exposure to 180° C. for 20 hours in air. Thus, Powder A had a minimum change in its molecular weight after heat exposure, which would allow a user to add only a minimum amount of virgin powder, such as 20 wt %, to refresh used powder for continued use in the next build. Rilsan® Invent Natural, on the other hand, exhibited a generally downward trajectory with respect to refresh properties. To illustrate, after aging under heat over time, polyamide-11 powders often change in color from a whitish color to a yellow color. Powder A did not yellow nearly as much as the more reactive Rilsan® Invent Natural, which would result a user having to use higher refresh wt % of powder for continued use in the next build, which can be more costly and less convenient.

More specifically, oxidation or thermal degradation of the two powders was evaluated using a yellowing index before after heat exposure in air. To begin, it was verified that both powders had a similar yellow index when fresh, and then, both were aged at 180° C. for 20 hours in air. Yellow index values (before and after heating) were obtained using the ASTM D1925 method (Plastic Test Standard for Yellowing). The Rilsan® Invent Natural powder, after heating for 20 hours at 180° C. in air, had a yellow index of 50. Powder A, on the other hand, only had a yellow index of 11.9, which is much closer to white than the Rilsan® Invent Natural powder, i.e. a lower yellow index indicates a whiter powder and a more stable material under an accelerated aging environment. Thus, it appears that Powder A was more recyclable as it had a stable solution viscosity (molecular weight) and did not have significant oxidation as indicated by its more stable yellow index. Rilsan® Invent natural oxidized to a much greater degree, indicating also a reduction in molecular weight.

What is claimed is:

1. A material set, comprising:
   a powder bed material, including a polyamide-11 powder having a D50 particle size from 35 µm to 65 µm and a solution viscosity from 1.5 to 1.75 at room temperature; and
   a fusing agent comprising an energy absorber capable of absorbing electromagnetic radiation to produce heat.

2. The material set of claim 1, wherein the solution viscosity changes no more than 5% when exposed to 180° C. for 20 hours in air.

3. The material set of claim 1, wherein the powder bed material has a yellow index value of less than about 10 as a virgin powder, and the yellow index value increases to no greater than 40 when exposed to 180° C. for 20 hours in air.

4. The material set of claim 1, the polyamide-11 powder has a D10 particle size from 15 µm to 45 µm, and a D90 particle size from 65 µm to 95 µm.

5. The material set of claim 1, wherein the energy absorber comprises a carbon black pigment, a near-infrared absorbing dye, a near-infrared absorbing pigment, a tungsten bronze, a molybdenum bronze, metal nanoparticles, or a conjugated polymer, or a combination thereof.

6. The material set of claim 1, wherein the powder bed material further includes an anti-oxidant powder admixed with the polyamide-11 powder.

7. A 3-dimensional printing system, comprising:
   a powder bed with a powder bed material including a polyamide-11 powder having a D50 particle size from 35 µm to 65 µm and a solution viscosity from 1.5 to 1.75 at room temperature;
   a fluid jet printer comprising a fluid jet pen in communication with a reservoir of a fusing agent to print the fusing agent onto the powder bed, wherein the fusing agent comprises an energy absorber capable of absorbing electromagnetic radiation to produce heat; and
   a fusing electromagnetic radiation source to expose the powder bed material to electromagnetic radiation sufficient to fuse polyamide-11 powder that has been printed with the fusing agent, but which does not fuse the polyamide-11 powder not printed with the fusing agent.

8. The system of claim 7, wherein the solution viscosity changes no more than 5% when exposed to 180° C. for 20 hours, or wherein the powder bed material has a yellow index value of less than about 10 as a virgin powder and the yellow index value increases to no greater than 40 when exposed to 180° C. for 20 hours in air.

9. The system of claim 7, wherein the polyamide-11 powder has a D10 particle size from 15 µm to 45 µm, and a D90 particle size from 65 µm to 95 µm.

10. The system of claim 7, wherein the powder bed material further includes an anti-oxidant powder admixed with the polyamide-11 powder.

11. The system of claim 7, wherein the energy absorber comprises a carbon black, a near-infrared absorbing dye, a near-infrared absorbing pigment, a tungsten bronze, a molybdenum bronze, metal nanoparticles, or a conjugated polymer, or a combination thereof.

12. A 3-dimensional printed part, comprising a part body comprising multiple layers of energy absorber and powder bed material fused together at individual layer thicknesses from 20 µm to 150 µm, wherein the powder bed material used to prepare the printed part includes a polyamide-11 powder having a D50 particle size from 35 µm to 65 µm and a solution viscosity from 1.5 to 1.75 at room temperature.

13. The 3-dimensional printed part of claim 12, wherein the solution viscosity changes no more than 5% when exposed to 180° C. for 20 hours.

14. The 3-dimensional printed part of claim 12, wherein the energy absorber includes carbon black pigment, near-infrared absorbing dye, near-infrared absorbing pigment, tungsten bronze, molybdenum bronze, metal nanoparticles, conjugated polymer, or combination thereof.

15. The 3-dimensional printed part of claim 12, wherein the X-Y axis and the Z axis elongation is from 20% to 80%, the tensile strength in both X-Y axis and Z axis is from 40 MPa to 60 MPa, and the tensile modulus in both X-Y axis and Z axis is from 1300 MPa to 2100 MPa.

16. The 3-dimensional printed part of claim 12, wherein the powder bed material has a yellow index value of less than about 10 as a virgin powder and the yellow index value increases to no greater than 40 when exposed to 180° C. for 20 hours in air.

17. The material set of claim 1, wherein the polyamide-11 powder has a solution viscosity from 1.5 to 1.65 at room temperature.

18. The material set of claim 1, wherein the polyamide-11 powder has a melting point from about 195° C. to about 203° C.

19. The system of claim 7, wherein the polyamide-11 powder has a solution viscosity from 1.5 to 1.65 at room temperature.

20. The system of claim 7, wherein the polyamide-11 powder has a melting point from about 195° C. to about 203° C.

* * * * *